United States Patent
Tatara

(10) Patent No.: US 9,096,164 B2
(45) Date of Patent: Aug. 4, 2015

(54) VEHICULAR LAMP

(71) Applicant: KOITO MANUFACTURING CO., LTD., Tokyo (JP)

(72) Inventor: Naoki Tatara, Shizuoka (JP)

(73) Assignee: Tokyo Electron Limited, Tokyo (JP)

( * ) Notice: Subject to any disclaimer, the term of this patent is extended or adjusted under 35 U.S.C. 154(b) by 66 days.

(21) Appl. No.: 13/893,702

(22) Filed: May 14, 2013

(65) Prior Publication Data

US 2013/0322106 A1 Dec. 5, 2013

(30) Foreign Application Priority Data

May 30, 2012 (JP) .................................. 2012-122739

(51) Int. Cl.
*B60Q 5/00* (2006.01)
*B60Q 1/26* (2006.01)
*B60Q 1/00* (2006.01)

(52) U.S. Cl.
CPC .............. *B60Q 5/008* (2013.01); *B60Q 1/0017* (2013.01); *B60Q 1/26* (2013.01)

(58) Field of Classification Search
CPC ................................ B60Q 5/008; B60Q 1/0017
See application file for complete search history.

(56) References Cited

U.S. PATENT DOCUMENTS

| 5,047,747 A * | 9/1991 | Gottlieb ........................ 340/463 |
| 2001/0046135 A1 * | 11/2001 | Soga et al. .................... 362/368 |
| 2009/0231867 A1 * | 9/2009 | Mochizuki et al. ........... 362/466 |
| 2010/0124071 A1 * | 5/2010 | Lee et al. ...................... 362/516 |

FOREIGN PATENT DOCUMENTS

JP 2007283809 11/2007

* cited by examiner

*Primary Examiner* — Elmito Breval
(74) *Attorney, Agent, or Firm* — Abelman, Frayne & Schwab

(57) ABSTRACT

Provided is a vehicular lamp that includes a lamp body, an exterior lens configured to define a lamp chamber between the lamp body and the exterior lens, and a vibration device fixed to a component of the vehicular lamp and configured to be vibrated by receiving an electric signal to cause the component to generate a sound. The vibration device includes a housing fixed to the component of the lamp, an electric circuit provided in the housing, a vibration body vibrated when the electric signal is input to the electric circuit, and a device connector to which an external connector is connected to input the electric signal to the electric circuit. In particular, the device connector is integrally provided in the housing.

7 Claims, 9 Drawing Sheets

VEHICULAR LAMP

CROSS-REFERENCE TO RELATED APPLICATIONS

This application is based on and claims priority from Japanese Patent Application No. 2012-122739 filed on May 30, 2012 with the Japan Patent Office and the disclosure of which is incorporated herein in its entirety by citing here.

TECHNICAL FIELD

The present disclosure relates to a vehicular lamp.

BACKGROUND

A vehicle such as, for example, a hybrid car or an electric vehicle that uses an electric motor as a driving source tends to be quiet while being driven at low speed, making it difficult for other vehicles and pedestrians to notice its approach. On this account, a technology to alarm the proximity of a vehicle is recently under development. For example, an alarm sound generating device has been proposed in which a vibration device is provided in, for example, the inside of a headlight cover of a vehicle to generate an alarm sound that alarms the proximity of the vehicle (see, e.g., Japanese Patent Application Laid-Open No. 2007-283809). According to such a device, there is an advantage in that the alarm sound may be delivered easily around the vehicle since the headlight cover vibrates to function as a speaker provided at the exterior of the vehicle.

SUMMARY

Japanese Patent Application Laid-Open No. 2007-283809 exemplifies a configuration that fixes the vibration device in the inside of the headlight cover, but the wiring layout between the vibration device and a sound generation control unit is not disclosed. In connection with this, a connection configuration may generally be considered in which harnesses each of which has a connector are drawn out from the vibration device and the sound generation control unit, respectively, and the harnesses are connected with each other in the inside of the headlight cover. However, since this may cause the number of parts in the connection configuration to be increased, there is a room for improvement of the cost. Also, in a configuration that fixes the vibration device in the inside of the headlight cover, the vibration device is fixed to the cover prior to mounting the headlight cover to the lamp body. Therefore, there may be a problem in handling the harness extending from the vibration device when assembling the lamp.

The present disclosure has been made in consideration of such a situation and an aspect of the present disclosure is to provide a sound generation device configured such that a vibration device is fixed to a vehicular lamp to generate a sound where a connection configuration between the vibration device and the control unit thereof may be realized at low cost. Also, another aspect of the present disclosure is to simplify the handling of the vibration device and the control unit thereof when connecting the vibration device and the control unit.

According to an aspect of the present disclosure, provided is vehicular lamp including: a lamp body; an exterior lens configured to define a lamp chamber between the lamp body and the exterior lens; and a vibration device fixed to a component of the vehicular lamp and configured to be vibrated by receiving an electric signal to cause the component to generate a sound. The vibration device includes: a housing fixed to the component of the lamp; an electric circuit provided in the housing; a vibration body that vibrates when the electric signal is input to the electric circuit; and a device connector to which an external connector is connected to input the electric signal to the electric circuit. The device connector being integrally provided in the housing.

According to the present aspect, since the housing of the vibration device is provided with the device connector integrally, it is not required to extend the harness from the vibration device and the harness may be omitted. Thus, the number of components may be suppressed to that extent. For this reason, the cost may be reduced. Also, the handling process required to connect a control unit connected to an external connector and the vibration device becomes simple and convenient since the harness does not extend from the vibration device.

Specifically, the vibration device may be fixed to a component of the lamp within the lamp chamber. In addition, the vehicular lamp may further include an opening provided at the lamp body to guide the external connector into the lamp chamber and a cover configured to seal the opening while supporting a harness connected to the external connector. With this arrangement, a configuration where the external connector is introduced into the lamp chamber and connected to the vibration device may be specifically implemented.

In this case, the cover and the external connector may be formed integrally with each other, and the cover may be configured to seal the opening when the external connector is connected to the device connector. With this arrangement, the workload may be reduced since the work of connecting the external connector to the device connector becomes the same as the work of sealing the opening with the cover.

Further, the cover and the external connector may be formed integrally with each other and the vibration unit may be fixed to the external lens as the component of the lamp. Also, the device connector may be configured to be electrically connected to the external connector when the external lamp is mounted to the lamp body. With this arrangement, the work of installing the external lens and the lamp body becomes the work of electrically connecting both of the connectors, thereby reducing the workload.

Another aspect of the present disclosure is also a vehicular lamp. The vehicular lamp includes: a lamp body; an exterior lens configured to define a lamp chamber between the lamp body and the exterior lens; and a vibration device fixed to a component of the lamp and configured to be vibrated by receiving an electrical signal to cause the component of the lamp to generate a sound. The vibration device includes: a housing fixed to the component of the vehicular lamp; an electric circuit provided in the housing; a vibration body configured to be vibrated when the electric signal is input to the electric circuit; and a harness connected to the electric circuit, and the harness is configured to be connected to an external control unit which is an output source of the electric signal without interposing a connector.

According to this aspect, a connector is not required when connecting the vibration unit and the external control unit. Thus, the number of components may be suppressed to that extent. For this reason, the cost may be reduced.

Meanwhile, any arbitrary combinations of above-described components and any changes in the present disclosure among e.g., methods, devices, and systems are also valid as an aspect of the present invention.

According to the present disclosure, in a device in which a vibration device is fixed to a vehicular lamp to generate a sound, a connection configuration of the vibration device and the control unit thereof may be implemented at low cost and the handling process required to connect the vibration unit and the control unit may become simple and convenient.

The above-described summary is illustration purposes only and does not intend to limit in any ways. In addition to the illustrative embodiment, examples, and features described above, additional embodiment, example, and features will become apparent by referring to the drawings and the following detailed description.

DETAILED DESCRIPTION

Figure 1:
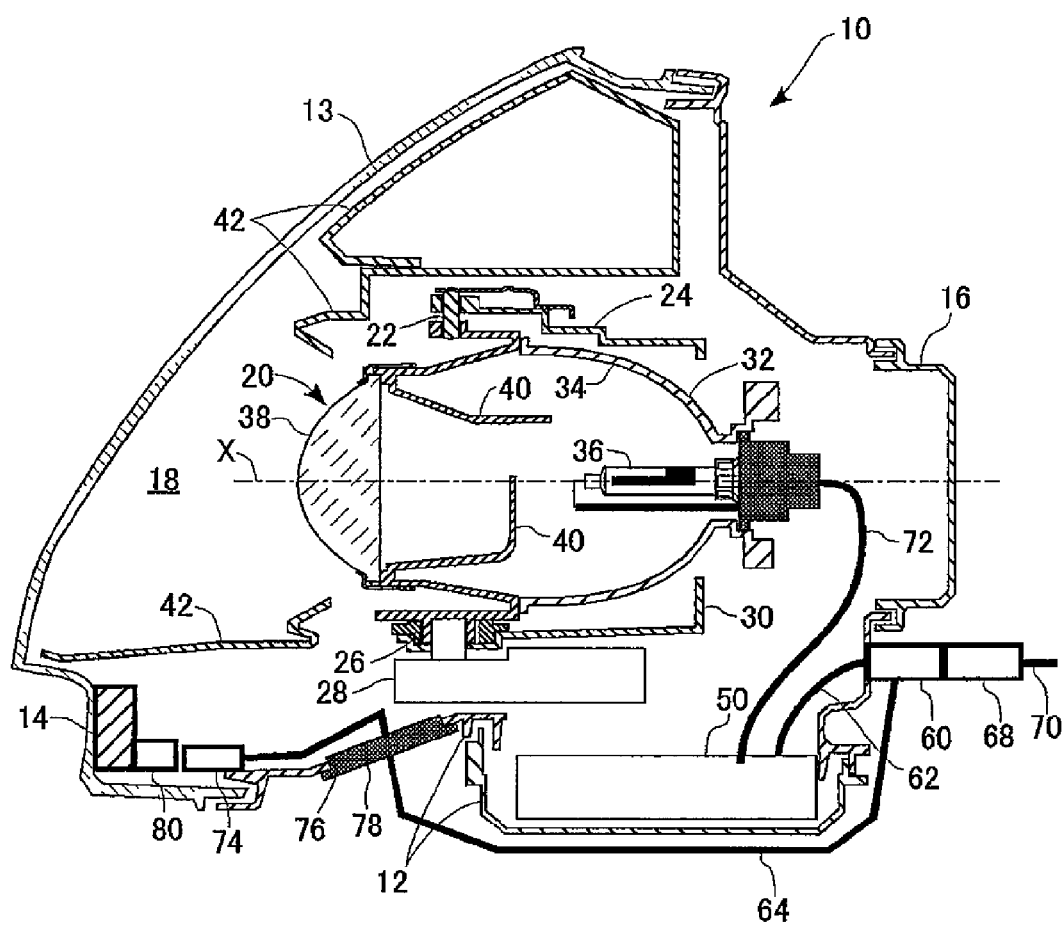
FIG. 1 is a schematic cross-sectional view illustrating an inner configuration of a vehicular lamp according to a first exemplary embodiment.

In the following detailed description, reference is made to the accompanying drawings which form a part hereof. The illustrative embodiments described in the detailed descriptions, drawings, and claims do not intend to limit. Other embodiments may be utilized and other modified examples may be made without departing from the spirit or scope of the subject matter presented here.

Hereafter, detailed descriptions will be made for exemplary embodiments of the present disclosure referring to the drawings. For the same or equivalent components depicted in each drawing, repeated descriptions will be omitted condignly by assigning the same symbols and the like. Meanwhile, even though a headlamp is exemplified mainly, a vehicular lamp or a system including the same may be a rear combination lamp that includes a back lamp or a stop lamp or other lamps.

First Exemplary Embodiment

FIG. 1 is a schematic cross-sectional view illustrating an inner configuration of a vehicular lamp according to a first exemplary embodiment. The drawing depicts a longitudinal cross-section including an optical axis X of the vehicular lamp. The vehicular lamp 10 is a light distribution variable headlamp where one lamp is arranged at each of the left and right of a vehicle in the width direction of the vehicle.

The vehicular lamp 10 includes a lamp chamber 18 which is formed by a lamp body 12 that includes openings in the front and the rear directions of the vehicle, a transparent exterior lens 13 that covers the front opening of the lamp body 12, and a cap 16 which covers the rear opening. In the lamp chamber 18, a lamp unit 20 which radiates the light to the front of the vehicle is accommodated. The exterior lens 13 is made of, for example, a light transmissive resin material.

The lamp unit 20 is connected to a body bracket 24 through a pivot mechanism 22 which becomes a center of the shaking of the lamp unit 20. The body bracket 24 is provided in the lamp body 12 integrally. As a result, the lamp unit 20 is supported at a predetermined position inside the lamp chamber 18, in which the lamp unit 20 may change its posture about the pivot mechanism to be in, for example a forward tilted posture or a rearward tilted posture.

The bottom surface of the lamp unit 20 is connected to a swivel actuator 28 through a rotation shaft 26. The swivel actuator 28 enables the lamp unit 20 to function as a light distribution variable headlamp for use in a curved road which illuminates the heading direction of a vehicle, for example, when the vehicle is driven around a curve. That is, the swivel actuator 28 swivels the lamp unit 20 about the rotation shaft 26 to the heading direction based on, for example, data of a steering amount provided from the vehicle side, shape data of the driving road provided from a navigation system, and a positional relationship of the vehicle in relation to a vehicle in front of the vehicle. With this arrangement, the radiation region is directed to the end of the curved road rather than to the front side of the vehicle, thereby improving the forward visibility of a driver.

The swivel actuator 28 is fixed to a unit bracket 30. The unit bracket 30 is connected with a leveling actuator which is arranged in the outside of the lamp body 12 and not depicted. Through the operation of this leveling actuator, an leveling adjustment is enabled; for example, when the lamp unit 20 is in a rearward tilted posture, the optical axis may be caused to be oriented upwards and when the lamp unit 20 is in a forward tilted posture, the optical axis may be caused to be oriented downwards. By the adjustment of the optical axis according to the posture of the vehicle, the forward radiation arrival distance by the vehicular lamp 10 may be adjusted to an optimum distance.

The lamp unit 20 is a projector type lamp unit and includes a container type lamp housing 32, a reflector 34 provided on the inner wall of the rear part of the housing 32, a light source 36 supported at the rear end of the lamp housing 32, a projection lens 38 configured to close the front end opening of the lamp housing 32, and a shade 40 provided at the front half part of the housing 32 to restrain the radiation direction of the light reflected by the reflector 34.

As for the light source 36, although a discharge lamp bulb is used in the embodiment, for example, an incandescent bulb, a halogen bulb, and an LED may also be used. In the present exemplary embodiment, the reflector 34 reflects the light radiated from the light source 36. The light projected from the light source 36 and the light reflected from the reflector 34 are guided to the projection lens 38.

Between the exterior lens 13 and the lamp body 12, an extension (pseudo-reflector) 42 is arranged so as to improve the beauty of the appearance in such a manner that the inner configuration of the vehicular lamp 10 is not exposed to the outside.

A vibration device 14 is fixed at the lower part of the exterior lens 13. The vibration device 14 is arranged under the extension 42 so that it is not seen. When an electrical signal is input to the vibration device 14, the vibration device 14 generates an alarm sound by vibrating the exterior lens 13 in response to the input electrical signal. As the vibration device 14 is fixed to the other part in this manner, the vibration of the vibration device 14 may be amplified so that an alarm sound may be generated which is louder than that generated by the vibration device alone. Also, since there is no need to provide an alarm sound generation device in the main body of the vehicle, the vibration device 14 contributes to saving the space of the main body of a vehicle. Typically, such a vehicular lamp is frequently arranged at each of the four corners of the vehicle, providing an alarm sound generation device in the vehicular lamp is suitable to generate an alarm sound extensively.

A lamp control unit 50 is arranged at a position under the lamp unit 20 and includes a radiation control unit that executes the radiation control of light. The radiation control unit executes the ON/OFF control of the lamp unit 20 and the control of the swivel actuator 28 and the leveling actuator. In the present exemplary embodiment, a vehicle control unit of the vehicular body side functions also as a sound generation control unit and executes the control of generation of the alarm sound by the vibration of the vibration device 14.

A connector 60 is fixed to the lamp body 12 to connect a signal line extending from the vehicular control unit. A harness 62 connected to the lamp control unit 50 is connected to a portion of terminals of the connector 60 and an end of a harness 64 extending toward the vibration device 14 is connected with the other terminals. The connector 60 is connected to a connector 68 which is connected to the vehicular control unit. A harness 70 extending from the vehicular control unit is connected to the terminals of the connector 68. The lamp control unit 50 is also connected to the lamp unit 20 through a harness 72.

An opening 76 is provided at the bottom part of the lamp body 12, and a connector 74 (functions as an "external connector") connected to the other end of the harness 64 is inserted through the opening 76. The opening 76 is sealed by a cover 78 made of, e.g., a resin material. In this exemplary embodiment, the harness 64 penetrates the cover 78 through a seal member (not depicted) and the front end of the harness 64 is connected to a terminal of the connector 74. Meanwhile, in a modified example, the cover may be made of a material such as, e.g., rubber that functions as a seal member as well, and the harness 64 may be inserted through and supported by the cover 78 in a fluid tight manner. The vibration device 14 is provided with a connector 80 (functions as a "device connector") integrally and the connector 74 is connected with the connector 80 in the inside of the lamp chamber 18.

Figure 2A:
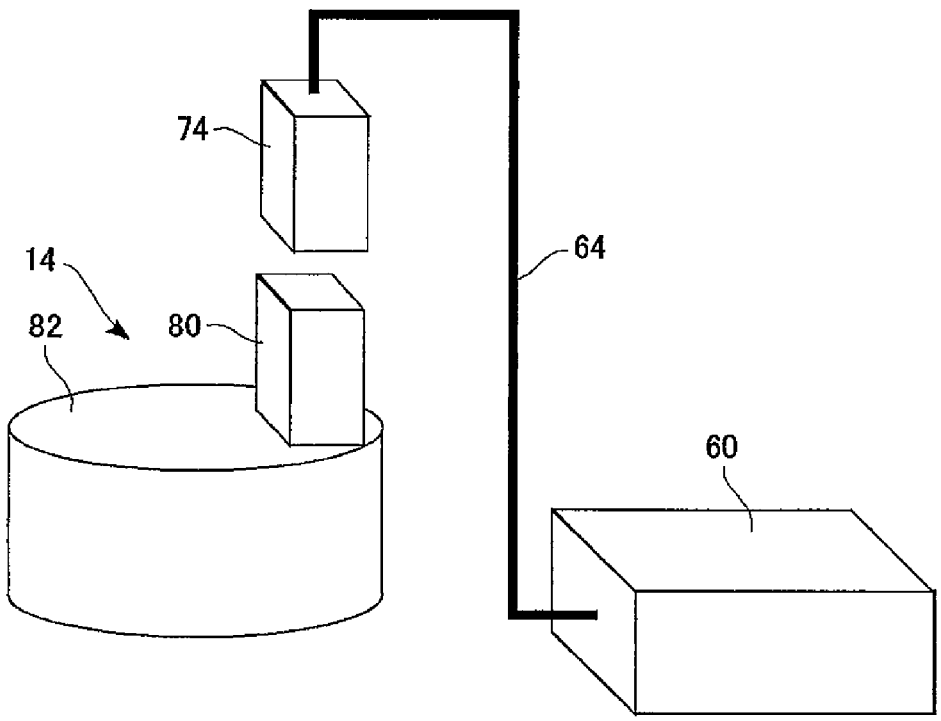
FIGS. 2A and 2B are explanatory views illustrating a configuration of a vibration unit and the peripherals thereof.
Figure 2B:
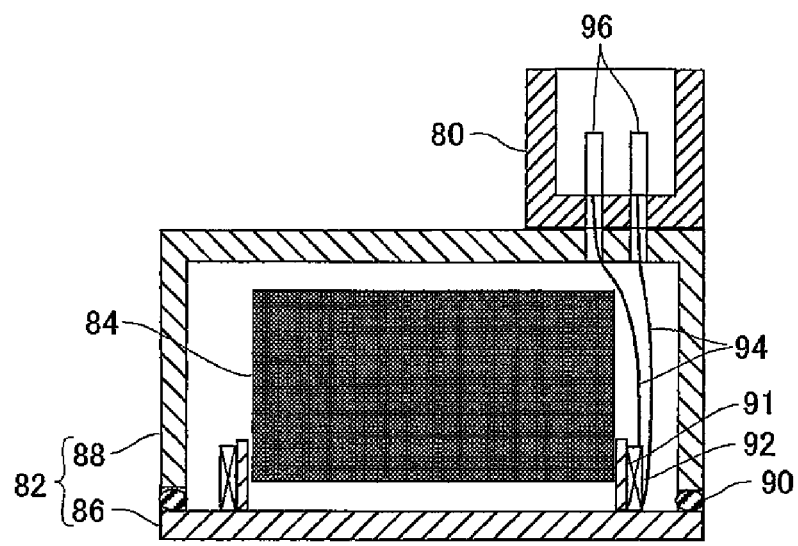

FIGS. 2A and 2B are explanatory views illustrating a configuration of a vibration device and the peripherals. FIG. 2A illustrates the appearance of the vibration device and FIG. 2B schematically illustrates the longitudinal cross-section of the vibration device. As illustrated in FIG. 2A, the vibration device 14 is configured in such a manner that a cylindrical vessel-shaped body 82 is integrally provided with the connector 80 at an end thereof and the connector 80 is detachably connected with the connector 74. An electrical signal input through the connector 60 from the vehicular control unit is supplied to an electrical circuit in the vibration device 14 through the harness 64 and the connectors 74, 80.

As illustrated in FIG. 2B, the vibration device 14 is an electromagnetic vibrator and is configured such that a magnet (a permanent magnet) 84 functioning as a vibration body is arranged inside the body 82. The body 82 is configured such that a first housing 86 and a second housing 86 are bonded to each other with a ring-shaped vibration-proof material 90 being interposed therebetween. In the first housing 86, a barrel-shaped core 91 is vertically provided and a driving coil 92 is wound around the core 91. The magnet 84 is formed in a cylindrical shape, fixed to a vibrating plate (not illustrated) that is attached to the first housing 86, and arranged to enter the barrel of the core 91, e.g., the interior of the driving coil 92.

The second housing 88 is formed as a cylindrical shape with a bottom and provided to surround the magnet 84. On the top surface of the second housing 88, the connector 80 is provided integrally. The driving coil 92 is connected to the terminals 96 of the connector 80. In the vibration device 14, alternating current is applied to the driving coil 92 through harnesses 94. At this time, the magnet 84 reciprocates in the axial direction of the core 91 by an alternating magnetic field produced by the driving coil 92 and the magnetic field of the magnet 84. The vibration of the magnet 84 is transmitted to the exterior lens 13 that constitutes the vehicular lamp, and a sound is generated from the exterior lens 13.

Figure 3:
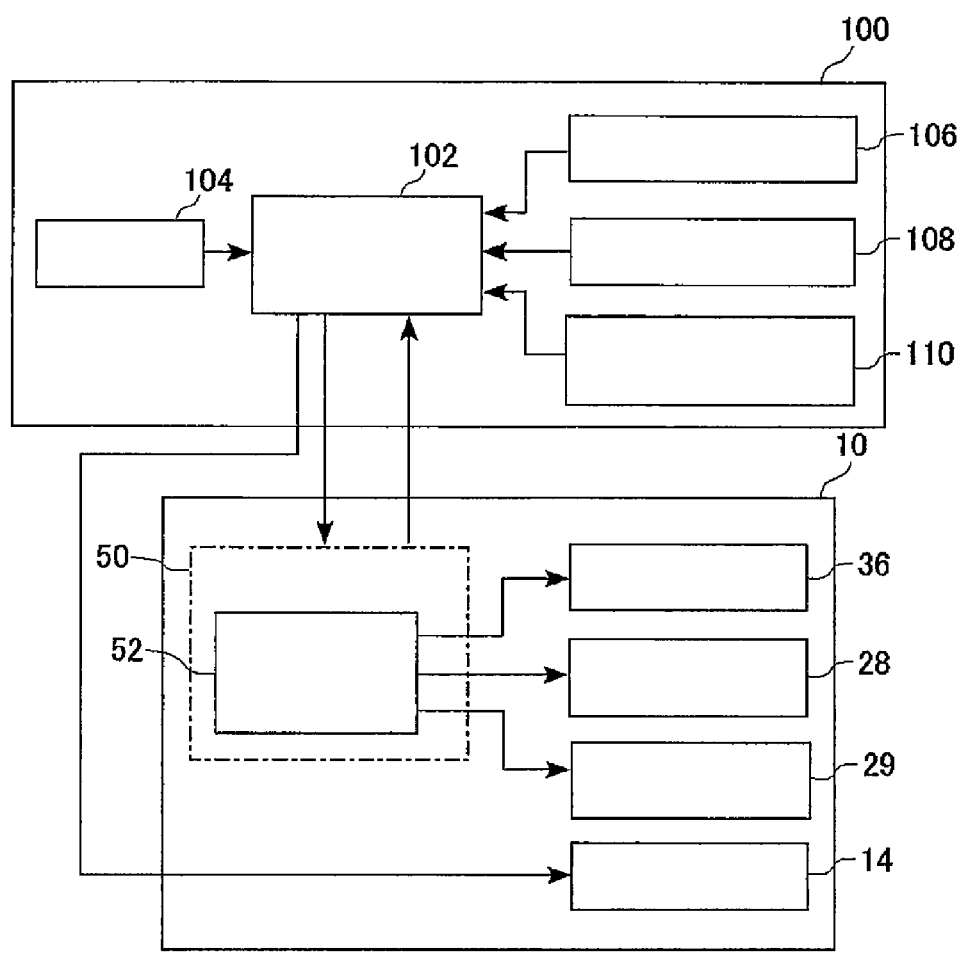
FIG. 3 is a functional block diagram illustrating an outline of a control system of the vehicular lamp.

FIG. 3 is a functional block diagram illustrating an outline of the control system of the vehicular lamp 10. The vehicular lamp 10 executes the radiation control and the sound generation control in cooperation with the vehicular control unit 102 of the vehicle 100 side. The vehicular control unit 102 and the lamp control unit 50 are connected to be capable of communicating with each other through a CAN ("Controller Area Network"). As described above, the lamp control unit 50 includes a radiation control unit 52 which executes the radiation control of light. The vehicular control unit 102 also functions as a sound generation control unit which executes the control of emission of the alarm sound.

The radiation control unit 52 executes the lighting control of the light source 36 when a lighting command is output from the vehicular control unit 102 based on the operation of a light switch 104 by a driver. Further, the radiation control unit 52 adjusts an optical axis of the lamp unit 20 for the vehicle width direction by controlling the swivel actuator 28 when a command is output from the vehicular control unit 102 based on information detected by, e.g., a steering sensor 106, a speed sensor 108, and a navigation system 110. At the time of turning, for example, driving on a curved road or making a right/left turn driving, the optical axis of the lamp unit 20 is made to be directed to the proceeding direction. Moreover, the radiation control unit 52 adjusts the optical axis for the upward and downward direction of the vehicle by operating the leveling actuator 29. For example, when the posture of the vehicle is tilted forwards or rearwards at the time of increasing or decreasing the speed, the posture of the lamp unit 20 is adjusted in such a manner that the front radiation arrival distance may be optimized.

In particular, the vehicular lamp 10 may be effectively applied to a vehicle such as, e.g., a hybrid car or an electric vehicle that tends to be quiet while being driven on the road at low speed. For example, when the vehicle is driven at low speed, the vehicular control unit 102 outputs an electrical signal to the vibration device 14 and vibrates the vibration device 14 to output an amplified alarming sound from the exterior lens 13. By the alarm sound from the exterior lens 13, the existence of the vehicle may be alarmed to people around the vehicle. In the present exemplary embodiment, when the speed detected by the speed sensor 108 is at a certain speed (e.g., 20 km/h) or less, the vehicular control unit 102 outputs an electrical signal to alarm the proximity of the vehicle to the vibration device 14 and executes the alarm control that generates an alarm sound by vibrating the vibration device 14 at a predetermined frequency.

According to the present exemplary embodiment, since the connector 80 is integrally provided on the body 82 of the vibration device 14 (the second housing 88), the harness extending to the exterior from the vibration device 14 is not required. Accordingly, the number of the parts may be suppressed to that extent. For this reason, the present system may be implemented at low cost. Also, since the harness does not extend from the vibration device 14, the external connector 74 may be connected to the fixed connector 80 making the handling simple and convenient. Moreover, since the harness does not extend from the vibration device 14 when the vibration device 14 is fixed to the inner wall of the exterior lens 13, there is no concern that the harness is sandwiched between the exterior lens 13 and the lamp body 12 when installing the exterior lens 13 and the lamp body 12. Accordingly, the installation work may be efficiently performed. Meanwhile, since the vibration-proof material 90 is interposed between the first housing 86 and the second housing 88 in the present exemplary embodiment, the vibration of the magnet 84 may be suppressed from being transferred to the connector 80. Accordingly, the connection state of the connector 80 and the connector 74 may be stably maintained.

Second Exemplary Embodiment

Figure 4:
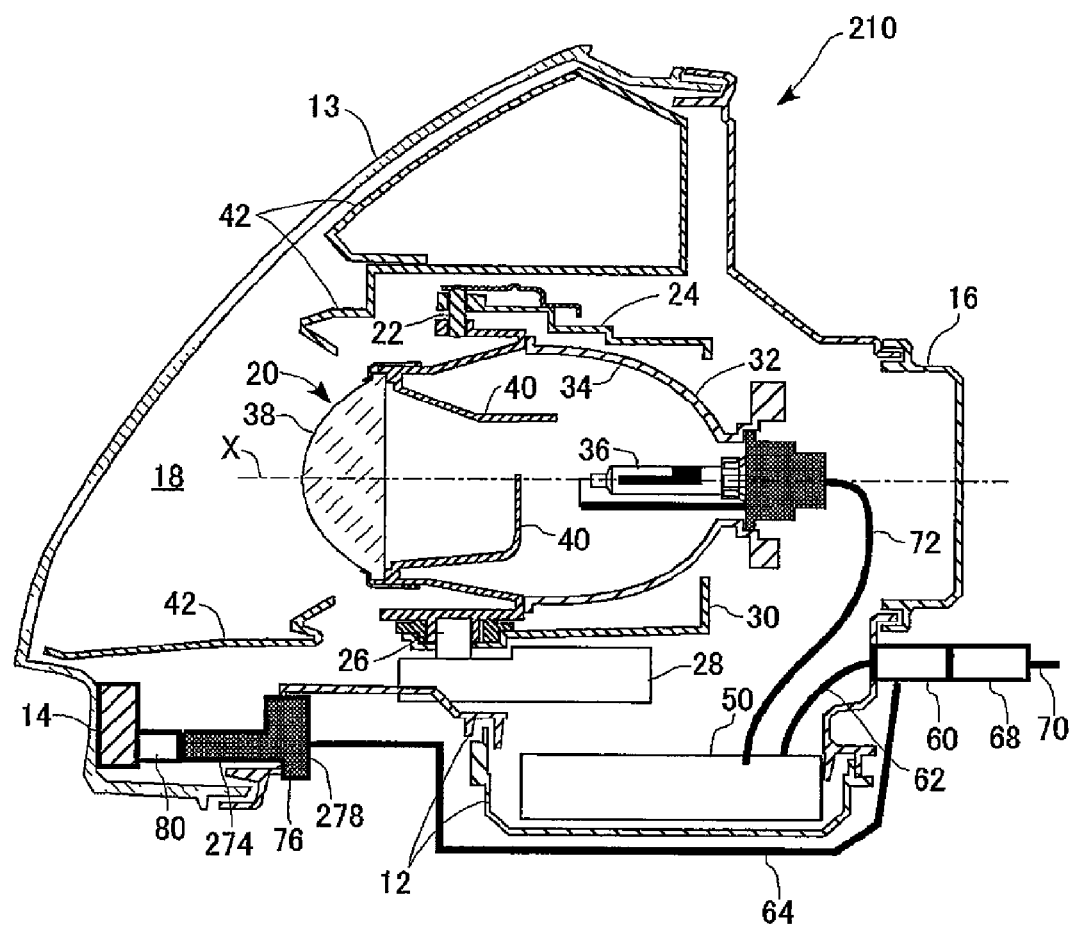
FIG. 4 is a schematic cross-sectional view illustrating an inner configuration of a vehicular lamp according to a second exemplary embodiment.

FIG. 4 is a schematic cross-sectional view illustrating an inner configuration of a vehicular lamp according to a second exemplary embodiment. In the vehicular lamp 210 of the present exemplary embodiment, a cover that seals the opening 76 of the lamp body 12 and a connector are formed integrally with each other. That is, a cover unit 278 is provided at the rear end of a connector 274 provided at the front tip of the harness 64 and the connector 274 is connected with the connector 80 so that the cover unit 278 seals the opening 76. With such a configuration, the connection work of connector 274 may be simplified to enhance the mountability.

Third Exemplary Embodiment

Figure 5:
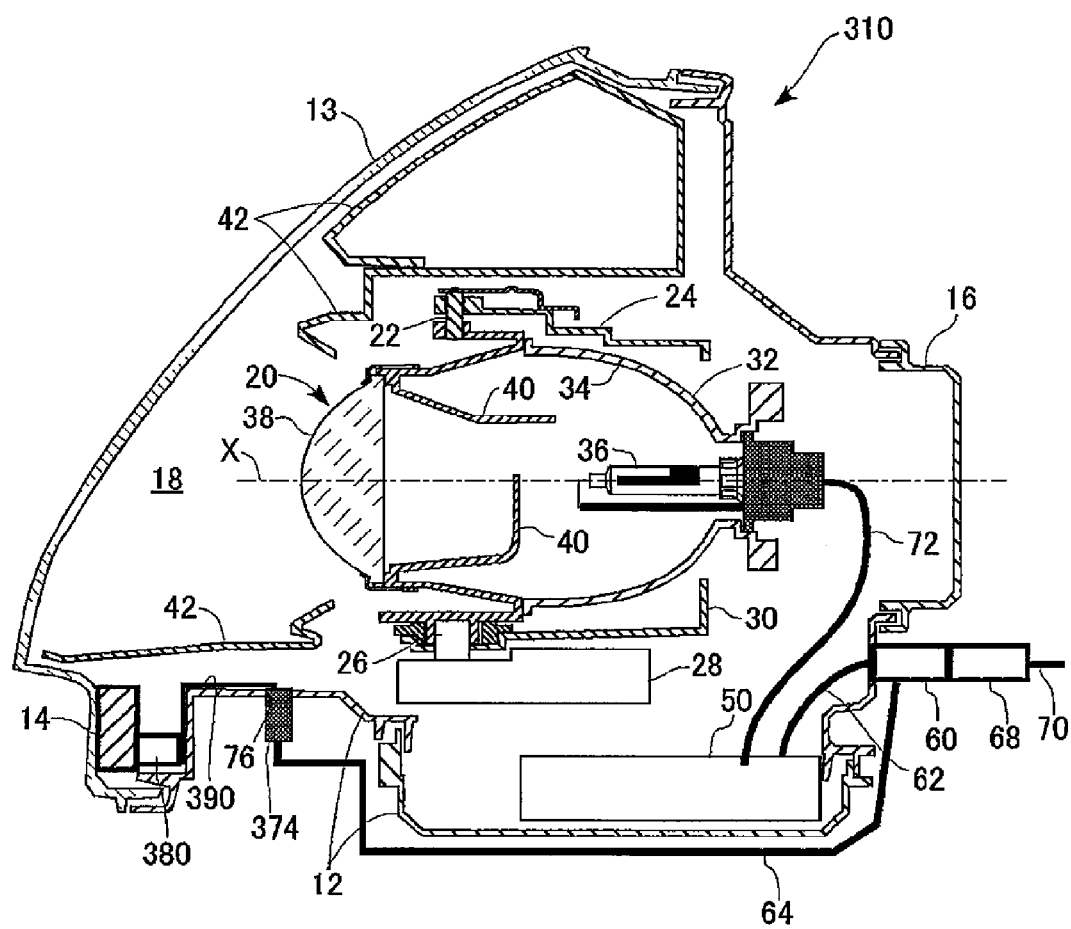
FIG. 5 is a schematic cross-sectional view illustrating an inner configuration of a vehicular lamp according to a third exemplary embodiment.
Figure 6:
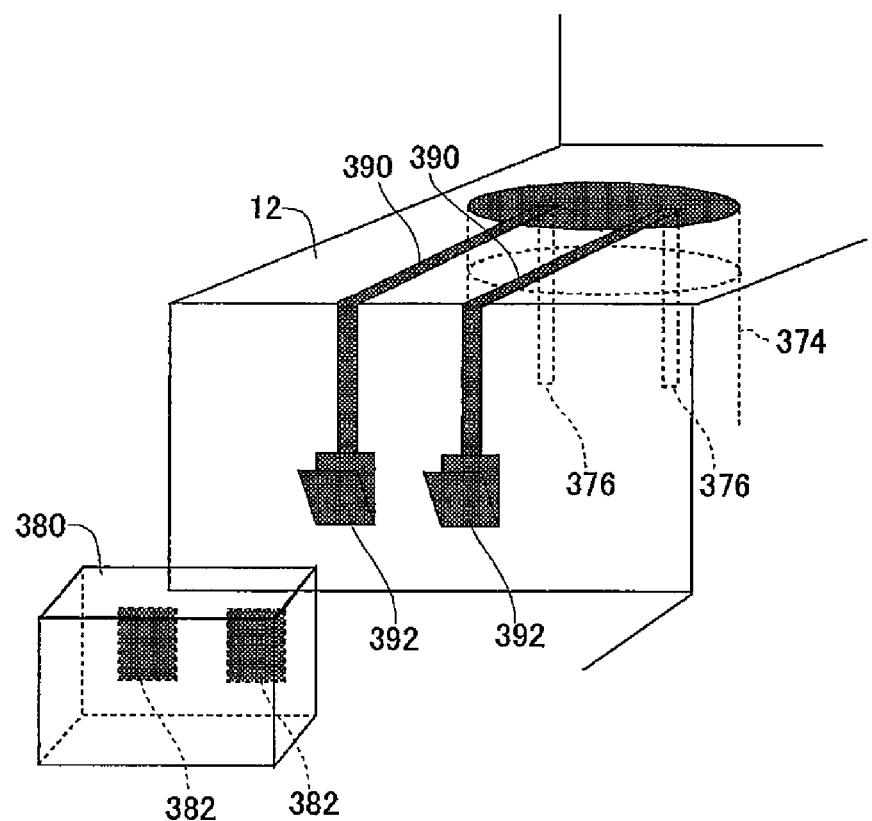
FIG. 6 is an explanatory view illustrating a configuration of a connector connecting parts.

FIG. 5 is a schematic cross-sectional view illustrating an inner configuration of a vehicular lamp according to a third exemplary embodiment. FIG. 6 is an explanatory view schematically illustrating the configuration of a connector connecting unit. As illustrated in FIG. 5, the vehicular lamp of the present exemplary embodiment, a cover that seals the opening 76 of the lamp body 12 and a connector are formed integrally with each other. That is, a connector 374 that is provided at the front end of the harness 64 serves as a cover as well. In addition, when the exterior lens 13 mounted on the lamp body 12, the connector 380 provided on the vibration device 14 and an external connector 374 are electrically connected with each other.

Specifically, as illustrated in FIG. 6, a pair of wires 390 is mounted on the inner wall of the lamp body 12 and an electric contact 392 of an elastic leaf spring type is provided at the front end of each of the wires 390. A pair of terminals 376 of the connector 374 are respectively connected to the ends of the wires 390 opposite to the electric contacts 392. Meanwhile, the connector 380 is also provided with a pair of electric contacts 382 that are connected to the pair of terminals, respectively. The pair of electric contacts 382 are arranged to face the pair of electric contacts 392, respectively.

With such a configuration, when the exterior lens 13 is mounted on the lamp body 12 as illustrated in FIG. 5, the electric contacts 382 of the vibration device 14 side and the electric contacts 392 of the wire 390 side are elastically connected with each other. For this reason, the connector 380 of the vibration device 14 side is electrically connected to the external connector 374. According to this configuration, the mounting work of the exterior lens 13 and the lamp body 12 may electrically connect both of the connectors 374, 380, thereby reducing the workload. Also, since the wires 390 (conductive paths) are configured to be formed in advance, the harness that connects the connector 374 and the connector 380 is not required, thereby enhancing the mountability.

Fourth Exemplary Embodiment

Figure 7:
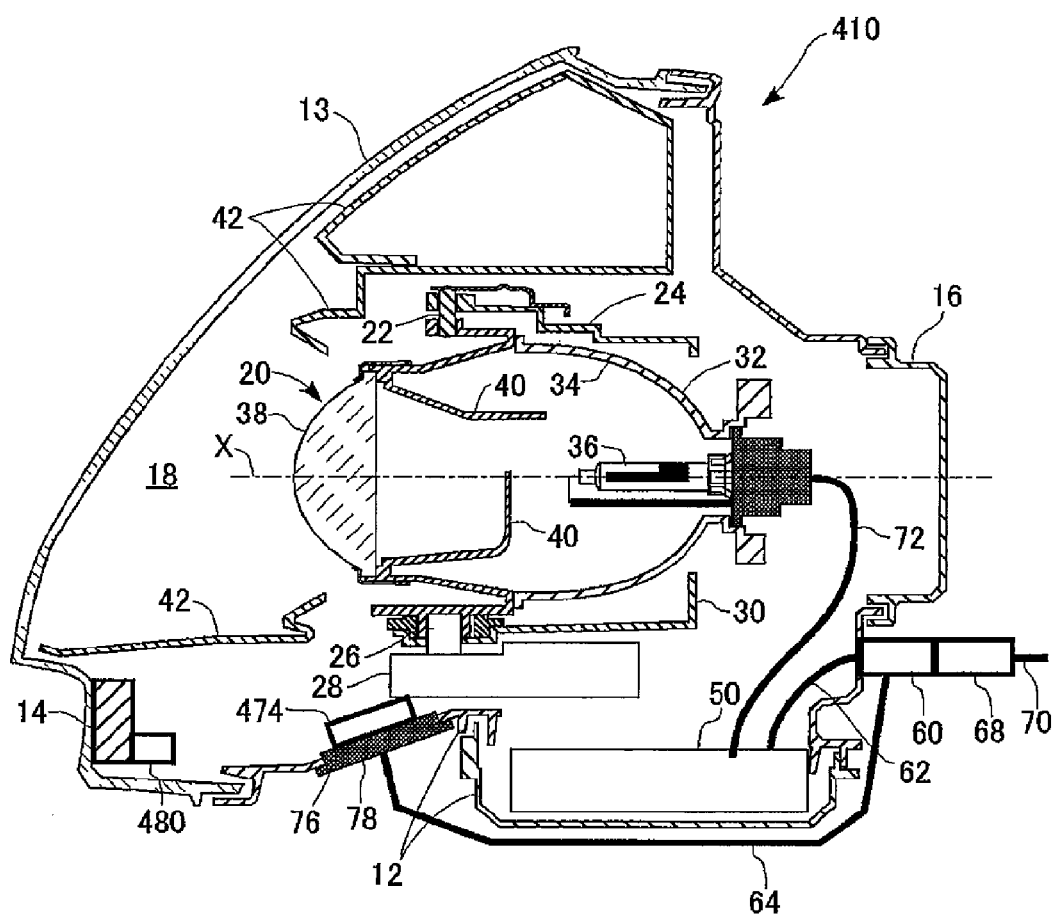
FIG. 7 is a schematic cross-sectional view illustrating an inner configuration of a vehicular lamp according to a fourth exemplary embodiment.

FIG. 7 is a schematic cross-sectional view illustrating an inner construction of a vehicular lamp according to a fourth exemplary embodiment. In the vehicular lamp 410 of the present exemplary embodiment, a wireless power supply is employed as a method of supplying electric power to the vibration device 14. Specifically, a transmitter 474 that transmits electric signals is provided at the front end of the harness 64 and the vibration device 14 is integrally provided with a receiver 480. By employing the wireless configuration, the mountability of the exterior lens 13 and the lamp body 12 may be enhanced. Further, since the wireless power supply itself is known in the related art, the detailed description thereof will be omitted.

Fifth Exemplary Embodiment

Figure 8:
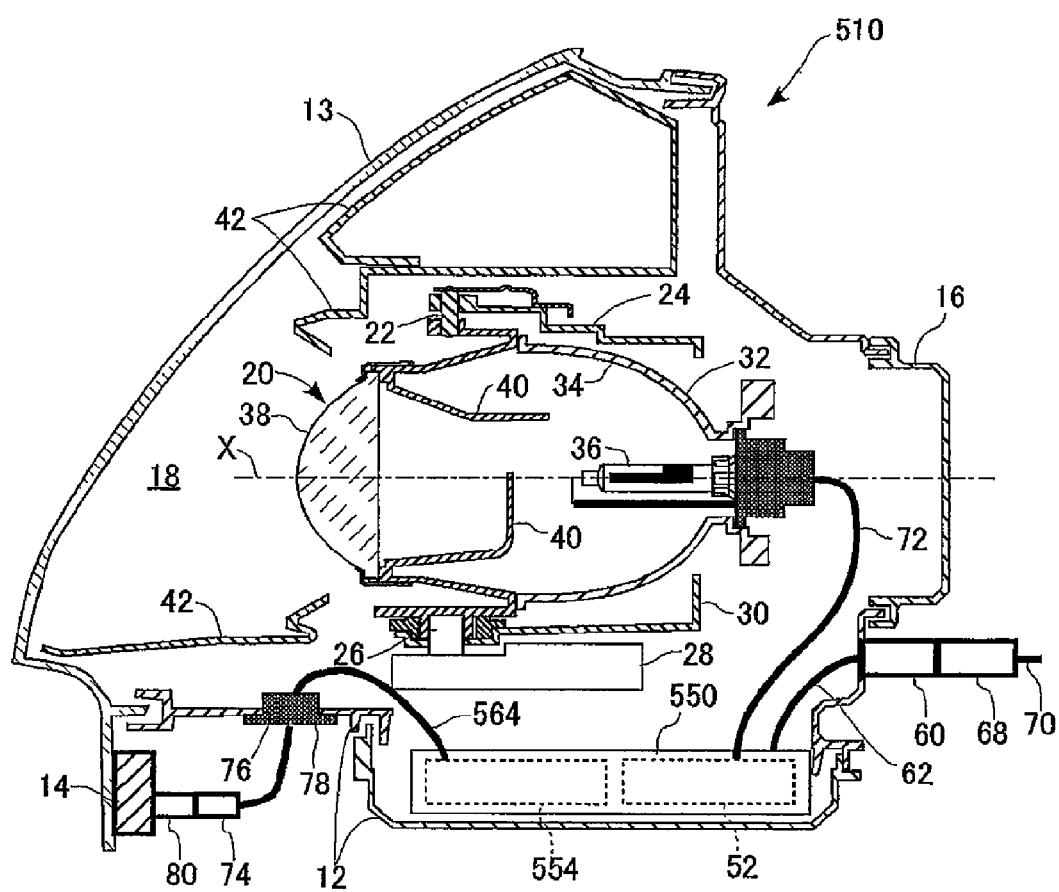
FIG. 8 is a schematic cross-sectional view illustrating an inner configuration of a vehicular lamp according to a fifth exemplary embodiment.

FIG. 8 is a schematic cross-sectional view illustrating an inner construction of a vehicular lamp according to a fifth exemplary embodiment. In the vehicular lamp 510 of present exemplary embodiment, a lamp control unit 550 is provided with a sound generation control unit 554 in addition to the radiation control unit 52. The sound generation control unit 554, when receiving an alarm command from the vehicular control unit 102, outputs an electric signal to the vibration device 14 based on the alarm command to vibrate the vibration device 14. Further, the vibration device 14 is arranged at the exterior of the lamp chamber 18 although it is fixed at the lower part of the exterior lens 13.

The sound generation control unit 554 is connected to the connector 80 through a harness 564. The harness 564 extends from the interior of the lamp chamber 18 through the cover 78 towards the exterior and is provided with the connector at the front end. With this configuration, the connector 74 and the connector 80 may be connected after the exterior lens 13 and the lamp body 12 are mounted. Also, the vibration device 14 may be fixed after the exterior lens 13 and the lamp body 12 are mounted. For this reason, there is no concern that the harness is sandwiched between the exterior lens 13 and the lamp body 12 when mounting the exterior lens 13 and the lamp body 12. As a result, the installation work may be performed efficiently.

Meanwhile, although an example in which the sound generation control unit 554 is provided inside of the lamp chamber 18 is presented in the present exemplary embodiment, the sound generation control unit may be provided in the outside of the lamp chamber 18. When both the vibration device 14 and the sound generation control unit 554 are provided in the outside in this manner, the cover 78 is not required, thereby making the mounting of the vibration device 14 easy. In contrast, both the vibration device 14 and the sound generation unit 554 may be provided in the inside of the lamp chamber 18. That is, the vibration device provided in the inside the lamp body may be configured to be electrically connected to the sound generation unit arranged in the inside of the lamp chamber through an external connector. Also in this case, the cover is not required.

Although the descriptions of the present disclosure have been made with reference to the exemplary embodiments, the present disclosure is not limited to the above-described exemplary embodiments and a proper combination or substitution of configurations of the exemplary embodiments belongs to the present invention. Also, a combination of the exemplary embodiments, a proper recombination of process orders or modifications such as, e.g., various design changes may be made to the exemplary embodiments and such modified examples may also belong to the scope of the present disclosure.

Modified Example 1

Figure 9:
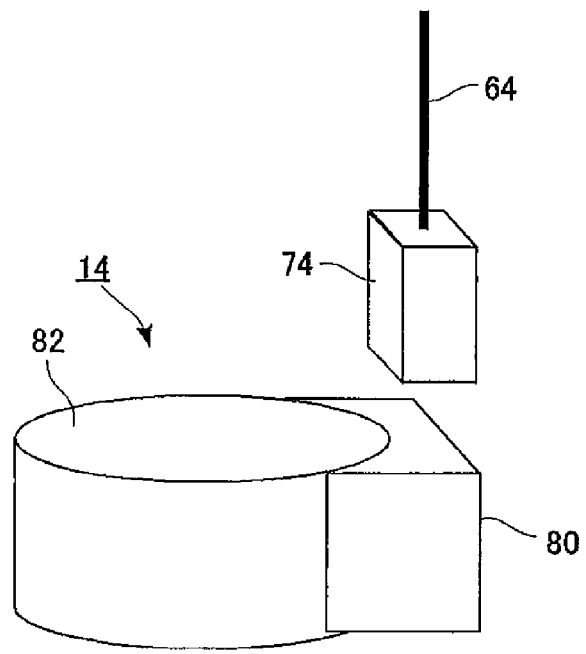
FIG. 9 is a diagram illustrating a configuration of a vibration device according to a modified example.

FIG. 9 is an explanatory view illustrating a configuration of a vibration device according to a modified example. As illustrated in FIG. 2, in the above-described exemplary embodiments, an example in which the connector 80 is provided at the end surface of the body 82 of the vibration device 14 has been illustrated. In a modified example, the connector 80 may be provided integrally on a side surface of the body 82 as illustrated in FIG. 9. Like this, when the arrangement configuration of the connector 80 is properly changed according to a space secured in fixing the vibration device, the versatility of the vibration device may be enhanced.

Modified Example 2

In the above-described exemplary embodiments, an example in which the cover sealing the opening of the lamp body is made of a resin material and a harness extends through a separate seal body has been presented. However, the cover may be formed from rubber so that the cover itself has a sealing function.

Modified Example 3

In the above-described exemplary embodiments, an example in which the housing of the vibration device and the device connector are formed integrally with each other has been presented. However, the vibration device and the device connector may be fabricated in different processes and then mounted integrally with each other. In this case, a seal body or a vibration-proof material may be interposed between the housing of the vibration device and the device connector.

Modified Example 4

Although not described in the above-described exemplary embodiments, the sound generation control unit and the vibration device may be configured to be connected only by a harness rather than through a connector. Also, the vehicular control unit and the vibration device may be configured to be connected only by a harness rather than through a connector. Such a configuration may reduce the number of components, thereby reducing the cost.

Modified Example 5

In the above-described exemplary embodiments, an example in which the vibration device is fixed to the exterior lens 13 of the head lamp. However, the vibration device may be fixed to, e.g., the lamp body 12 or other lamp components. Also, the vibration device may be fixed to a rear combination lamp or other components of the lamp.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular lamp comprising:
a lamp body;
an exterior lens configured to define a lamp chamber between the lamp body and the exterior lens; and
a vibration device fixed to a component of the vehicular lamp,
wherein the vibration device includes:
a housing provided within the lamp chamber and fixed to the component of the vehicular lamp accommodating an electric circuit and a vibration body configured to be vibrated when an electric signal is input to the electric circuit in order to cause the component of the vehicular lamp to generate a sound;
and
a device connector integrally provided with the housing and configured to detachably connect the housing with an external connector such that the external connector can be detachably connected to the device connector without an additional wiring in order to be connected with the electric circuit and the vibration body in the housing.

2. The vehicular lamp of claim 1, wherein the vibration device is fixed to the component in the lamp chamber, and further comprising:
an opening provided in the lamp body to guide the external connector into the lamp chamber; and
a cover configured to seal the opening while supporting a harness connected to the external connector.

3. The vehicular lamp of claim 2, wherein the cover and the external connector are formed integrally with each other, and the cover is configured to seal the opening when the external connector is connected to the device connector.

4. The vehicular lamp of claim 2, wherein the cover and the external connector are formed integrally with each other,
the vibration device is fixed to the external lens as the component of the vehicular lamp, and
the device connector and the external connector are configured to be electrically connected to the external connector when the external lens is mounted to the lamp body.

5. The vehicular lamp of claim 3, wherein the cover and the external connector are formed integrally with each other,
the vibration device is fixed to the external lens as the component of the vehicular lamp, and
the device connector and the external connector are configured to be electrically connected to the external connector when the external lens is mounted to the lamp body.

6. The vehicular lamp of claim 1, wherein the housing comprises a first housing being attached to the exterior lens accommodating the vibration body and the second housing connected to the first housing with a vibration-proof material interposed therebetween.

7. The vehicular lamp of claim 1, wherein the vibration body includes a magnet and a driving coil connected to the magnet with one end and to the device connector with the other end such that the magnet is electrically connected to the external connector through the device connector.

* * * * *